United States Patent
Stober et al.

(10) Patent No.: US 10,963,230 B2
(45) Date of Patent: Mar. 30, 2021

(54) SINGLE PAGE APPLICATION CONTINUOUS INTEGRATION, BUILD, AND DEPLOYMENT

(71) Applicant: International Business Machines Corporation, Armonk, NY (US)

(72) Inventors: Thomas Stober, Herrenberg (DE); Carsten Leue, Sindelfingen (DE); Sven Sterbling, Tuebingen (DE); Uwe Hansmann, Tuebingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/275,493

(22) Filed: Feb. 14, 2019

(65) Prior Publication Data
US 2020/0264848 A1 Aug. 20, 2020

(51) Int. Cl.
| | | |
|---|---|---|
| G06F 9/44 | (2018.01) | |
| G06F 8/60 | (2018.01) | |
| G06F 8/36 | (2018.01) | |
| G06F 8/70 | (2018.01) | |
| G06F 8/40 | (2018.01) | |
| G06F 8/65 | (2018.01) | |

(Continued)

(52) U.S. Cl.
CPC .............. G06F 8/60 (2013.01); G06F 8/36 (2013.01); G06F 8/40 (2013.01); G06F 8/65 (2013.01);
(Continued)

(58) Field of Classification Search
CPC ...... G06F 9/45529; G06F 9/547; G06F 9/451; G06F 16/958; G06F 16/9566;
(Continued)

(56) References Cited

U.S. PATENT DOCUMENTS

10,038,605 B2   7/2018  Veeravalli et al.
10,114,637 B1 * 10/2018  Willson .................. G06F 8/71
(Continued)

FOREIGN PATENT DOCUMENTS

WO     2017019749 A1    2/2017

OTHER PUBLICATIONS

Chen et al., "Automatic Generation of Web Applications from Visual High-Level Functional Web Components", Research Article, Hindawi Publishing Corporation, Advances in Software Engineering, vol. 2009, Article ID 879725, 17 pages, doi:10.1155/2009/879725, Accepted Nov. 25, 2008.
(Continued)

*Primary Examiner* — Tuan A Vu
(74) *Attorney, Agent, or Firm* — Jeffrey M. Ingalls

(57) ABSTRACT

Automatically generating a client-side application based on available components is provided. A source code and related build information of a component is stored in a component repository. The component is developed in a developer mode of a developer tool. An existing single-page application is changed using a non-expert editing tool by selecting a component from the component repository, retrieving the selected component from the repository, extracting build information from the retrieved component, adding dependencies regarding the retrieved component to a single-page packaging of the existing single-page application, and compiling the single-page application together with the retrieved component.

16 Claims, 6 Drawing Sheets

(51) Int. Cl.
*G06F 9/445* (2018.01)
*H04L 29/08* (2006.01)
(52) U.S. Cl.
CPC ............ *G06F 8/70* (2013.01); *G06F 9/44526* (2013.01); *H04L 67/24* (2013.01); *H04L 67/34* (2013.01)
(58) Field of Classification Search
CPC ...... G06F 16/972; G06F 16/986; G06F 21/53; G06F 8/71; G06F 8/60; G06F 8/34; G06F 8/65; G06F 9/44526; H04L 67/24; H04L 67/34
See application file for complete search history.

(56) References Cited

U.S. PATENT DOCUMENTS

| | | | |
|---|---|---|---|
| 2015/0052498 A1* | 2/2015 | Chauhan | G06F 16/972 717/109 |
| 2015/0278171 A1 | 10/2015 | Lefebvre et al. | |
| 2017/0046135 A1* | 2/2017 | Hazarika | G06F 9/451 |
| 2017/0237799 A1 | 8/2017 | Veeravalli et al. | |
| 2017/0250853 A1* | 8/2017 | Evans | G06F 21/53 |
| 2017/0257464 A1* | 9/2017 | Mapes | G06F 16/986 |
| 2018/0173390 A1* | 6/2018 | Dunne | G06F 16/9566 |
| 2018/0285328 A1* | 10/2018 | Pivato | G06F 16/958 |
| 2018/0349149 A1* | 12/2018 | Chute | G06F 9/45529 |
| 2019/0303500 A1* | 10/2019 | Mathews | G06F 16/9566 |
| 2020/0019414 A1* | 1/2020 | Byard | G06F 9/547 |

OTHER PUBLICATIONS

Stępniak et al., "Performance Analysis of SPA Web Systems", Information Systems Architecture and Technology: Proceedings of 37th International Conference on Information Systems Architecture and Technology —ISAT 2016—Part I. Advances in Intelligent Systems and Computing, vol. 521. Springer, Cham, 13 pages, Sep. 17, 2016.

* cited by examiner 100 method 102 storing a source code and build information 104 changing an existing single-page application using a non-expert editing tool by 106 selecting a component from the component repository 108 retrieving the selected component from the repository 110 extracting build information from the retrieved component 112 adding dependencies regarding the retrieved component 114 compiling the single-page application together with the retrieved component 116 deploying the compiled single-page application

FIG. 1

402 existing

```
@NgModule({
imports: [
]
})
export class AppModule {
}

{
„dependencies": {

}
}
```

404 now

```
import { NewModule } from „newmodule";

@NgModule({
imports: [
  NewModule
]
})
export class AppModule {
}

{
  „dependencies": {
    „newmodule": „^1.0.0"
  }
  }
```

FIG. 4

SINGLE PAGE APPLICATION CONTINUOUS INTEGRATION, BUILD, AND DEPLOYMENT

BACKGROUND

The invention relates generally to a software development environment, and more specifically, to automatically generating a client-side application based on available components.

Delivering computing capabilities by way of browser enabled applications has become the predominant way to let users interact with computer systems. Single page applications (SPAs) are a relevant concept for building versatile and responsive web sites. As their development approach unleashes a powerful set of capabilities, the coding and development effort is becoming more complex. A simple point-and-click approach, as in the case of a classical webpage design, may no longer work. Therefore, it is important to keep in mind that SPAs require a compilation of the application code and that the development of SPAs is a more sophisticated piece of work than the setup of traditional websites.

SUMMARY

According to embodiments of the present disclosure, a computer-implemented method for automatically generating a client-side application based on available components is provided. The method comprises storing, in a component repository, a source code and related build information of a component. The component may have been developed in a developer mode of a developer tool. The method also comprises changing an existing single-page application by use of a non-expert editing tool adapted for selecting a component from the component repository, retrieving the selected component from the repository, extracting build information from the retrieved component, adding dependencies regarding the retrieved component to a single-page packaging of the existing single-page application, and compiling the single-page application together with the retrieved component.

According to another aspect of the present disclosure, a system for automatically generating a client-side application based on available components is provided. The system comprises a component repository adapted for storing a source code and related build information of a component. The component may have been developed in a developer mode of a developer tool. The system may comprise as well a non-expert editing tool adapted for changing an existing single-page application by use of a selection unit adapted for selecting a component from the component repository, a retriever unit adapted for retrieving the selected component from the repository, an extraction unit adapted for extracting build information from the retrieved component, an adder unit adapted for adding dependencies regarding the retrieved component to a single-page packaging of the existing single-page application, and a compile unit adapted for compiling the single-page application together with the retrieved component.

According to another aspect of the present disclosure, a computer program product for performing the method is provided.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 1 depicts a flow diagram of the disclosed computer-implemented method for automatically generating a client-side application based on available components, according to embodiments of the present disclosure.

FIG. 4 depicts a comparison of code fragments, according to embodiments of the present disclosure.

Figure 2:
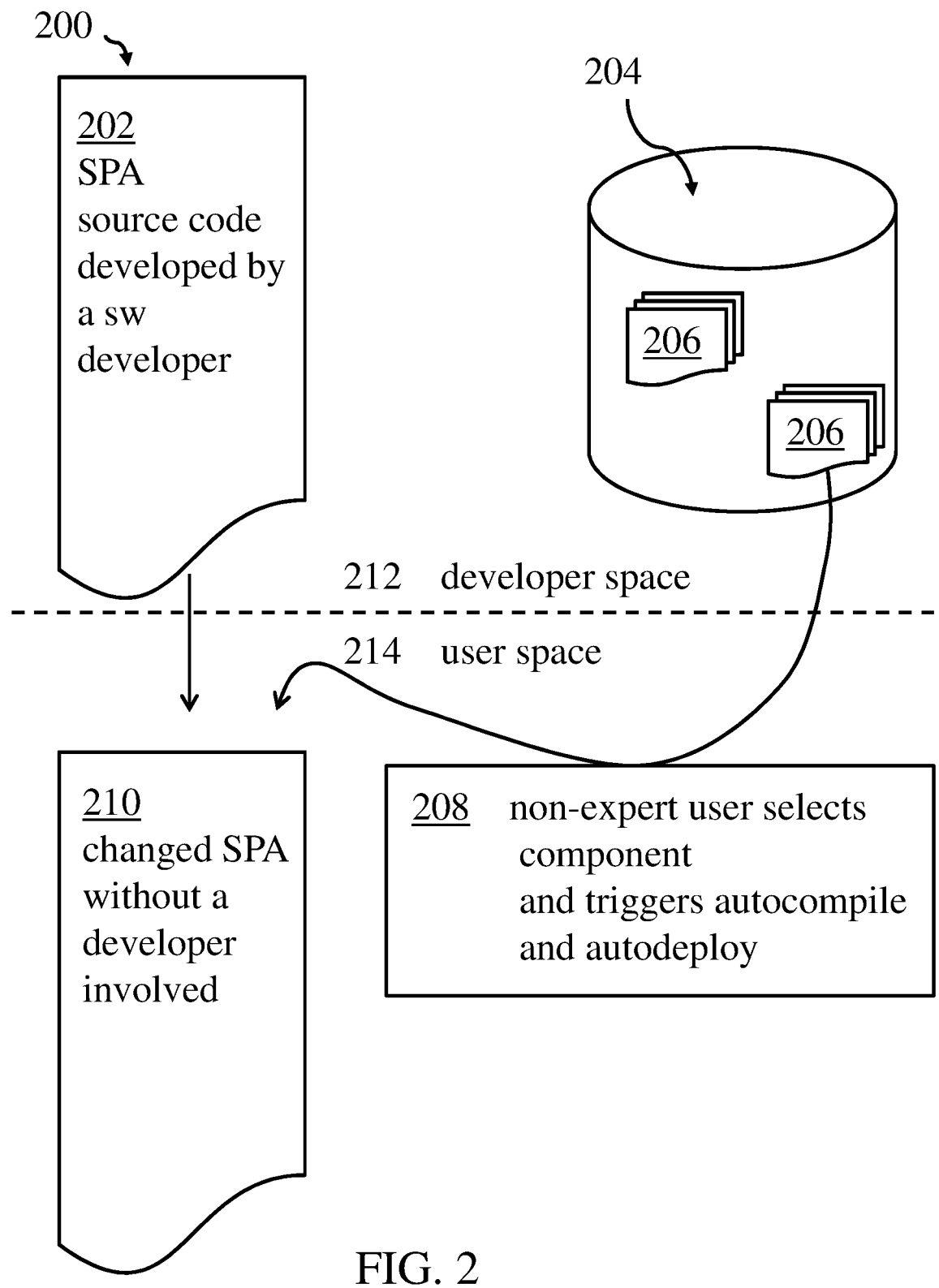
FIG. 2 depicts a block diagram of an example user's scenario, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to software development, and more particular aspects relate to a computer-implemented method for automatically generating a client-side application based on available components. While the present disclosure is not necessarily limited to such applications, various aspects of the disclosure may be appreciated through a discussion of various examples using this context.

Traditional webpages—and thus, websites—can be edited and encoded by users with limited software development skills, but a single-page application (SPA) is more the domain of skilled software developers. This creates a bottleneck. Change requests to SPAs arrive at an ever-increasing pace because enterprises need to react to customers' and employees' requirements faster and faster. If developers are not available to change existing SPAs, the inability of companies to react to changing requirements will lag, causing those enterprises face a competitive disadvantage.

A SPA is a web application or web site that may interact with the user by dynamically rewriting the current page rather than loading entire new pages from a server. This approach may avoid interruption of the user experience between successive pages, making the application behave more like a desktop application. In a SPA, either all necessary code—HTML, JavaScript, and CSS (cascades style sheet)—may be retrieved with a single page load, or the appropriate resources are dynamically loaded and added to the page as necessary, usually in response to user actions. In contrast to classical webpages, a SPA may typically require a compile process before a deployment is possible.

It is an important assumption of many modern SPAs that highly complex structures require the compilation and integration of components that can either be loaded at runtime or dynamically added at runtime. In both cases, the developer has to manually identify the new components and dependencies, then trigger the build process manually. Components may generally be software code snippets built to enhance the functionality of SPAs and may here also have additional information required for a build process.

Each dependency may be a requirement for a software component or a library or framework component that needs to be built into a soft application skeleton in order to make it work (compile and deploy). A newly loaded additional component may also have its dependencies—i.e., the requirement to an additionally loading of more dynamic components. This may trickle down in a cascade in the art of 100 for a typical SPA. This may have the negative effect that SPAs, not following the proposed concept, may have a slow response time or a comparably long load time, so that users may become frustrated.

Generally, expert tools for developers and end-user tools for non-IT/business people address different audiences and feature different capabilities. Expert-tools often expose a command line interface only and give very fine grained access to very specific capabilities and behavior of the code, which can be combined to assemble larger units of code. A user, i.e., the developer, needs to understand the context of what he is doing. In contrast to that, the end-user tools only expose larger use cases, which can be triggered as a whole, mostly by a graphical user interface. In the context of this disclosure, the expert-tool allows the developer to develop components and specify their behavior down to each single pixel of the user interface. The end-user tool only allows the business user to select and add a component without modification ("as is"/"as provided by the developer"). At most, the behavior of the component can be altered by some configuration options, which a developer had prepared upfront ("Points of Variability").

Builds may be triggered by various means, for example by commit in a version control system, by scheduling via a cron-like mechanism, and by requesting a specific build URL. It may also be triggered after the other builds in the queue have completed.

The proposed computer-implemented method for automatically generating a client-side application based on available components may offer multiple advantages and technical effects:

Many of the current disadvantages of SPAs can be overcome. Changes to an existing SPA may be delegated to end-users. With classical SPAs, this was not possible because of the complex development process, dependencies between different modules and components, the requirement to compile the SPA source code, and necessity to use a software developer tool. Source code may comprise any collection of code, possibly with comments written, using a human-readable programming language, usually as plain text. The source code of a program may be specially designed to facilitate the work of computer programmers who specify the actions to be performed by a computer, mostly by writing source code. The source code is often transformed by a compiler into binary machine code understood by the computer. The machine code might then be stored for execution at a later time.

SPAs tend to become slower as more components are dynamically linked. Frameworks, utility libraries, and component repositories may have to be integrated dynamically at runtime. A component repository may be a storage system (hardware and/or software) for persistently store source code components for the Angular application platform. Each component may have its own set of dependencies, which in time may pull in additional dependencies. The total number of individual dependencies of a non-trivial SPA may be in the order of 100. The root cause for becoming slower and slower may be seen in the fact that pulling in many individual requests for small files is pretty slow. If the dependencies are fulfilled step-by-step, a sequence of components to be loaded dynamically has to be triggered. Alternatively, one may issue many single requests or would accept a massive overhead of unnecessary downloaded code.

Angular (commonly referred to as "Angular 2+" or "Angular v.2 and above") may denote the known TypeScript-based open-source front-end web application platform led by the Angular Team at a major software company and by a community of individuals and corporations.

The usage of Angular as a framework solves this dilemma. Given that all components and dependencies are unknown at the time, Angular may produce an optimal bundle.

A core concept of the proposed idea is to aggregate all components and dependencies into a single bundle combined with the "lazy loading" feature of Angular. The compiler can split the full bundle to smaller ones and "lazy load" them when accessing.

This way, it is possible to elegantly split the tasks of enhancing and updating existing SPA code between developers and uses without software developer skills. These non-experts are supported by the proposed method and the related system. The developer may produce a software application skeleton in the form of an SPA using his comparably complex software development environment and the non-expert person can—using a more simple tool—change individual components or add new components with new or changed functionality to the core SPA. This way, the scarce resources of developers are protected and IT affine users are enabled to make modifications and enhancements to existing SPAs without having developer skills.

The required changes to the existing software application are very limited: one may need to add dependencies on code modules to package JaveScript Object Notation, or JSON (one line of code). JSON is a known open-standard file format that uses human-readable text to transmit data objects consisting of attribute-value pairs and which is often used for asynchronous browser-server communication, including a replacement for XML in some AJAX-style systems. JSON is a language-independent data format, and it was derived from JavaScript.

The modified component can be imported into the main application of the SPA (which may require two lines of code), and a rebuild process can be started and executed automatically. Additionally, standard components like NPM (short and formerly for Node Package Manager) as source code component repository, as well as Git as version control system may be used. The developer can now stay in his developer space developing new skeletons for SPAs, and the business user can use a simple change tool to influence the design/build/compile/deploy software lifecycle. In fact, the user may select updated or additional functionality from the NPM repository, load that to a Git repository, and let the SPA be rebuilt and deployed completely automatically. Thus, no confusion exists between parts of the code being in Git. NPM is well accepted as a component registry, no dynamic loading of components is required, and performance of the changed SPAs is not degraded by continuously loading components due to spread dependencies.

Git is known as a version control system technique and system for tracking changes in computer files and for coordinating the work of these files among multiple people.

It is primarily used for source-code management in software development, but it can be used to keep track of changes in any set of files. As a distributed revision-control system, it is aimed at speed, data integrity, and support for distributed, non-linear workflows. Git was originally developed in the context of the Linux operating system development.

NPM is a known package manager for the JavaScript programming language. It is the default package manager for the JavaScript runtime environment Node.js. It consists of a command line client, also called NPM, and an online database of public and paid-for private packages, called the NPM registry. The registry can be accessed via the client, and the available packages can be browsed and searched via the NPM website. A user may, e.g., select a component and may include it in his SPA.

In embodiments, the method may comprise deploying the compiled single-page application. This final step before being able to call and use the single page application may also include making it available in a repository from where it may be called by a browser of an endpoint device. The repository may comprise—among others—executable single page applications to be used in a browser.

Deploying may comprise making an application—like a SPA—ready for use by an end-user. The general deployment process comprises several interrelated activities with possible transitions between them. These activities can occur at the producer side or at the consumer side, or both. Because every software system is unique, the precise processes or procedures within each activity can hardly be defined. Therefore, "deployment" should be interpreted as a general process that has to be customized according to specific requirements or characteristics. Here, it may basically mean to make the complete compiled SPA available in a repository for download and execution by a browser.

The single-page application may be activated by a browser, e.g., it may be executed in the environment of a browser on an endpoint device, such as a personal computer, or a mobile device.

The component may be a result of a TypeScript based front-end web application framework, a programming environment for the open-source programming language which was originally developed and maintained by Microsoft. It may be noted that TypeScript is a superset of JavaScript allowing optionally static typing to the language. Such a framework may, e.g., be the open source web application platform Angular. This may allow a future proven development environment in which software developers and non-software-developers can collaborate during the life-time of a single page application.

The single-page packaging may be based on JSON, i.e., on the open-standard file format that uses human-readable text to transmit data objects, which is often used for a synchronous browser-server communication. Also here, an already standard component is used for the inventive concept. Although originally developed for personal computer environments, it may be possible to use it also for iOS (the Apple operating system) or the Android operating system.

Single-page packaging may refer a process of combining software components as part of a software development process. The here proposed concept may rely on in Jenkins as a tool for that. Jenkins is an open source automation server and helps to automate the non-human part of the software development process with continuous integration and facilitating technical aspects of continuous delivery. It is a server-based system that runs in servlet containers such as Apache Tomcat. It supports version control tools, including AccuRev, CVS, Subversion, Git, Mercurial, Perforce, TD/OMS, ClearCase and RTC, and may execute Apache Ant, Apache Maven and sbt based projects as well as arbitrary shell scripts and Windows batch commands.

The compiling may be performed by NPM. Thus, a well-accepted tool may be used as a repository as well as a tool for a software life cycle integration and compilation step. In embodiments, the compiling may be performed after regularly time intervals or after a predetermined time period. This may guarantee that the single page application may always use the latest available code update available for the component in the repository. Hence, the user having changed the single page application does not need to care about updating his enhancement to the single page application.

The selection of a component may be made from a plurality of repositories. Thus, a user may not be bound to only one provider of new components but can choose from a plurality of repositories. This may trigger competition between developers developing components for different repositories and thus, a development and change rate under the control of the end-user may be (no software developer having developed the single page application) increased. In embodiments, the repository may be an app-store. Because app-stores are common these days and the typical end-user is familiar with them, they may use the app-store to retrieve new functions to be integrated in a single page application without bothering a developer in their own organization. Once the single page application has been developed by a developer (team), end-users are able to enhance the single page application without the further help of a software developer in their organization. End-users may simply use what has been developed by others—commercially available or as open source—and change the enterprise applications.

The method may further comprise selecting a second component from the repository (or from a second repository), treat the second component in the same way as the component selected for the repository, such that the compiling the single-page application together with the retrieved component also comprises a compiling of the second component. With this additional feature, the single page application may also be changed using combinations of new components which may have a respective mutual dependency. However, also for such changes to a single page application, no software developer may be required to change the single page application.

Referring now to FIG. 1, a block diagram of a computer-implemented method for automatically generating a client-side application based on available components is depicted, according to embodiments of the present disclosure. FIG. 1 shows a block diagram of an embodiment of the computer-implemented method 100 for automatically generating a client-side application—in particular a single page application (SPA) based on available components, in particular so-called Angular components. The method comprises storing, at 102, the source code and related build information of a component (at least one component) in a component repository (e.g., NPM). The component may be developed in a developer mode of a developer tool which is not for use by a non-technician. The build information may be data required to execute and finalize a software build process to transform one or more compiled pieces of code to an executable software application, i.e., the all "open ends" (i.e., not yet satisfied and set address fields) are set correctly so that the software application can be executed on a computing device by an operating system.

The developer mode may generally be an expert mode of operation of a software development tool typically addressing the needs of software developer professionals. These tools would clearly be too complicated for non-IT specialists. On the other side, the non-software-developer may use a non-expert editing tool for selecting a new (Angular) component from the NPM repository and trigger the rebuild process of the SPA via Git and NPM until a deployable version exists, i.e., until the adapted SPA is stored on a SPA repository from which the SPA may be downloaded via a browser to be executed on an endpoint device.

The method 100 comprises also changing, at 104, an existing single-page application using a non-expert editing tool—in particular, a software tool explicitly made for end-users with no programming skills. The specific non-expert editing tool supports the end-user to perform the following tasks more or less automatically. Alternatively, the software developer and the non-technician may use the same tool, but in different operating modes. The expert may operate the tool in an expert mode, making all features of the software development tool available. The non-technician may use the tool in a non-expert mode under which only a limited number of features is activated, so that the non-expert may fulfill his mission, and change an existing SPA, having it compiled and deployed.

The non-expert editing tool supports or performs automatically the following activities: selecting (mainly, point-and-click), at 106, a component from the component repository (e.g., NPM), retrieving, at 108, the selected component from the repository, extracting, at 110, build information (which may comprise details on how to include said respective component in the SPA) from the retrieved component, adding, at 112, dependencies (e.g., library dependencies) regarding the retrieved component to a single-page packaging of the existing single-page application, and compiling, at 114, the single-page application together with the retrieved component. Additionally, the deployment of the compiled single-page application, at 116, may be triggered automatically.

Referring now to FIG. 2, depicted is a block diagram 200 of an example user's scenario of the proposed concept. A developer may develop a SPA 202 (source code developed using a developer toolset). This may be a skeleton of a more or less complete SPA. It may be changed or enhanced by a non-expert user. On the other side, other software developers (others than the one having developed the SPA 202) may have developed components 206 (e.g., NPM) to be used in an open-source sense. These components may be used after a financial transaction via an app store (or app marketplace). A type of digital distribution platform for computer software, often in a mobile context but also for personal computers or servers. Apps provide a specific set of functions which, by definition, do not include the running of the computer itself. Complex software designed for use on a personal computer, for example, may have a related app designed for use on a mobile device. Hence, an app store can be seen as a repository to select a new component for a SPA. Some sort of financial transaction may be involved using the component. App stores also typically reflect this commercial aspect.

The components may be available from a repository 204. The developers may stay in their developer space 212 using their developer tools and are so able to focus completely on their software development work. On the other side, a user may stay on his side of the fence, in the user space 214. The user may select a component 206 from the repository 204 and may trigger an auto-compile process and an auto-deploy tool 208. This may happen completely independent of any software developer. At the end of the process, a changed SPA 210 can be generated automatically.

Figure 3:
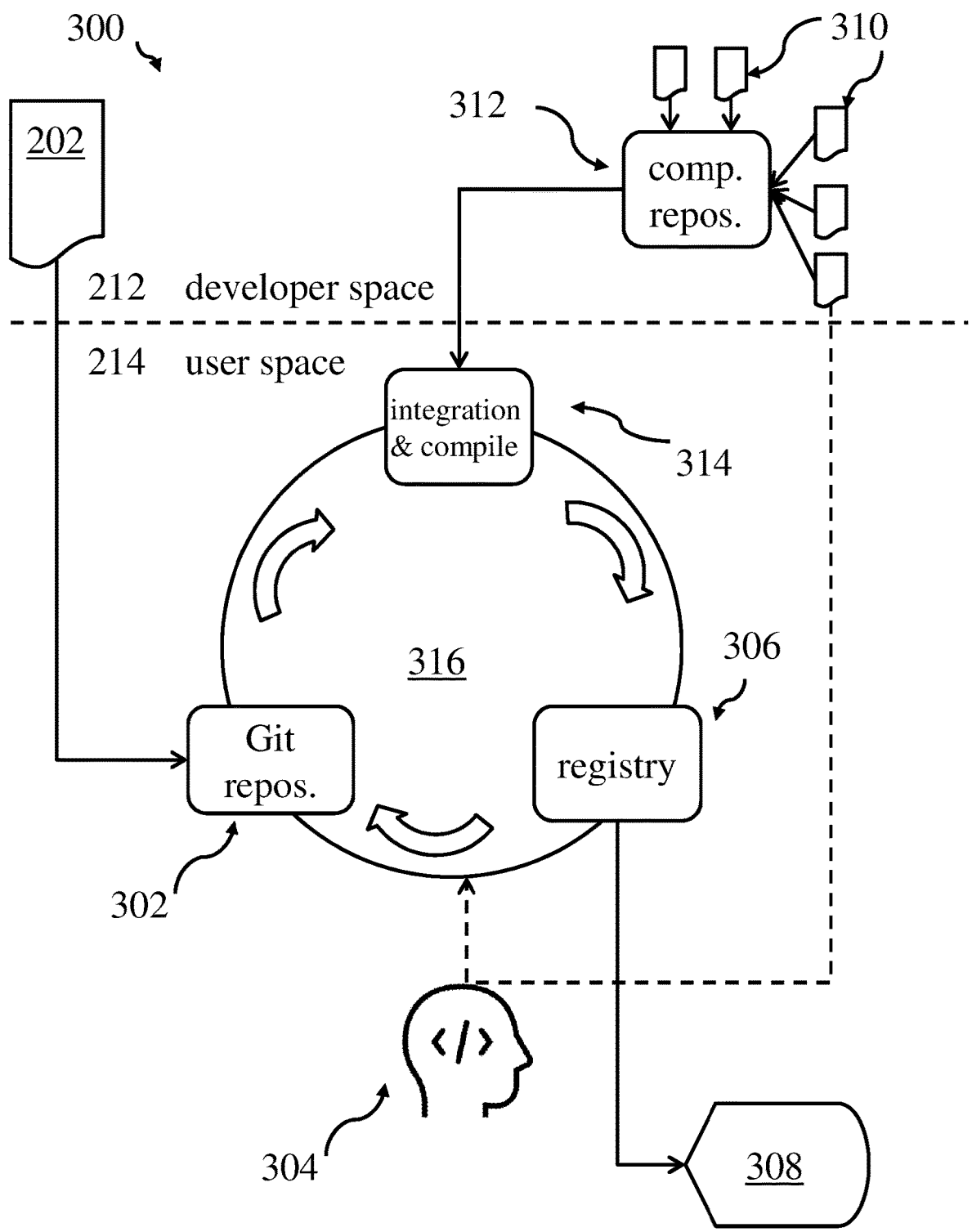
FIG. 3 depicts a block diagram of the disclosed system for automatically generating a client-side application based on available components, according to embodiments of the present disclosure.

Referring now to FIG. 3, depicted a technical block diagram 300 of an embodiment of the present disclosure. The software skeleton 202 may be managed by a Git system for version control, and other purposes. A non-technician (in general, the business user) 304 can change an existing SPA being deployed as part of the registry 306, from where it may be selected, downloaded and executed in a browser 308 on a user device.

The non-technician 304 can select a component, 310, from a component repository 312 (e.g., NPM), in which software developers have registered source code of additional components, and handed over to the Git repository 302 for version control, etc. the non-expert editing tool (not shown) of the non-technician 304 also controls an integration of the compiled step 314, in order to integrate the already existing SPA 202 with the one or more new components 310, and finally deploy the changed SPA to the repository 302. This way, those focusing on the developer space 212 are not involved in changing an existing SPA because this can be done by a non-technician 304 completely independent. The update cycle 316 does not need any software developer involvement.

Referring now to FIG. 4, depicted is a comparison of code fragments for state-of-the-art component 402 compared to a version 404 developed according to embodiments of the present disclosure. The comparably simple changes in three lines are shown in bold letters. However, this little change is able to build the basis for a significant and elegant way to include non-technicians into the development and change process of SPAs.

Figure 5:
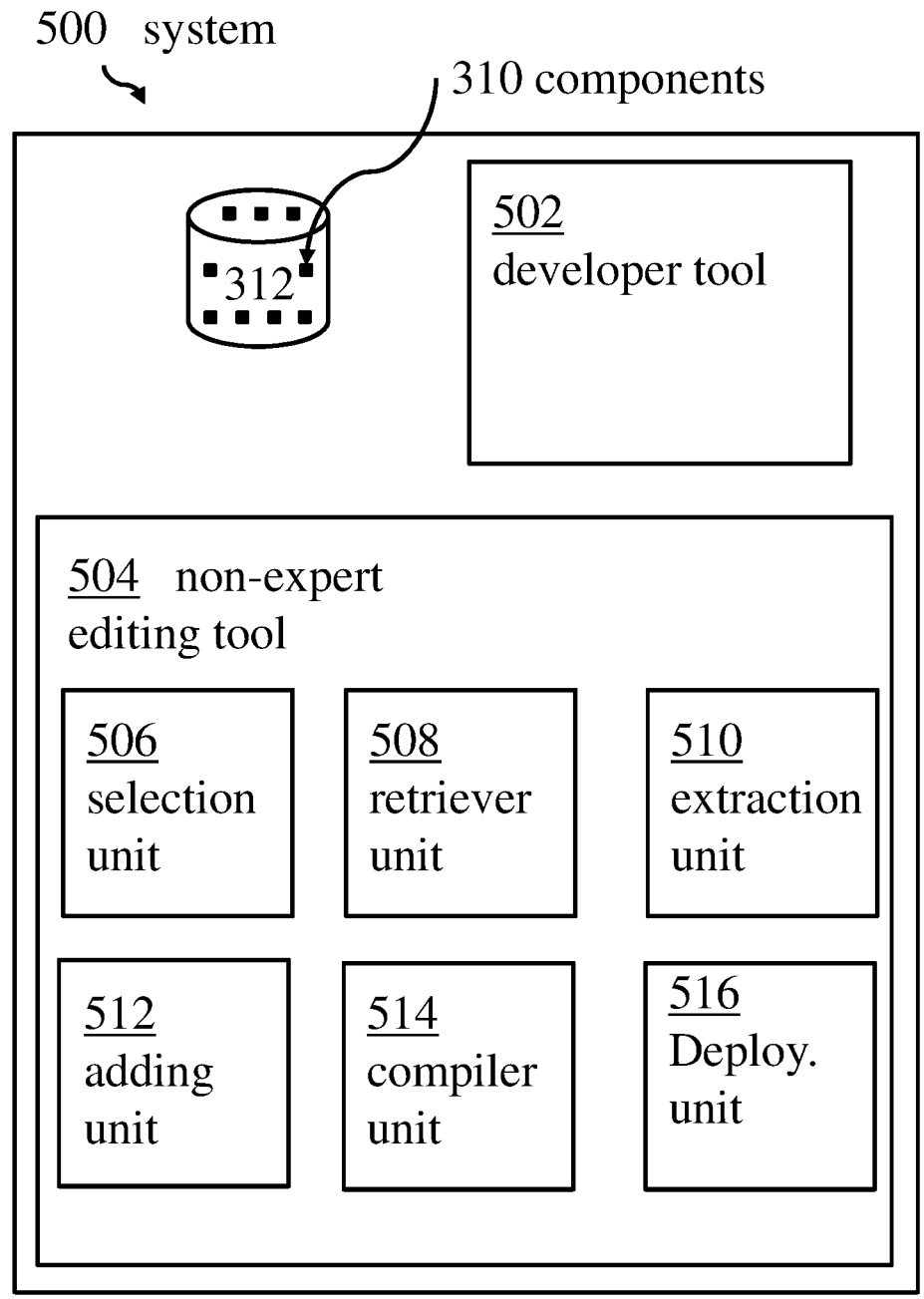
FIG. 5 depicts a block diagram of an example of the inventive developer system for automatically generating a client-side application based on available components, according to embodiments of the present disclosure.

Referring now to FIG. 5, depicted is a block diagram of an example of the inventive developer system 500 for automatically generating a client-side application based on available components, according to embodiments of the present disclosure. The system 500 comprises a component repository 312 adapted for storing a source code and related build information of a component, 310. The component has been developed in a developer mode of a developer tool 502. The system 500 comprises a non-expert editing tool 504 adapted for changing an existing single-page application by use of the following components: a selection unit 506 adapted for selecting a component from the component repository, a retriever unit 508 adapted for retrieving the selected component from the repository, and extraction unit 510 adapted for extracting build information from the retrieved component, an adding unit 512 adapted for adding dependencies regarding the retrieved component to a single-page packaging of the existing single-page application, and a compiler unit 514 adapted for compiling the single-page application together with the retrieved component. Last but not least, a deployment unit 516 may be functionally integrated.

Figure 6:
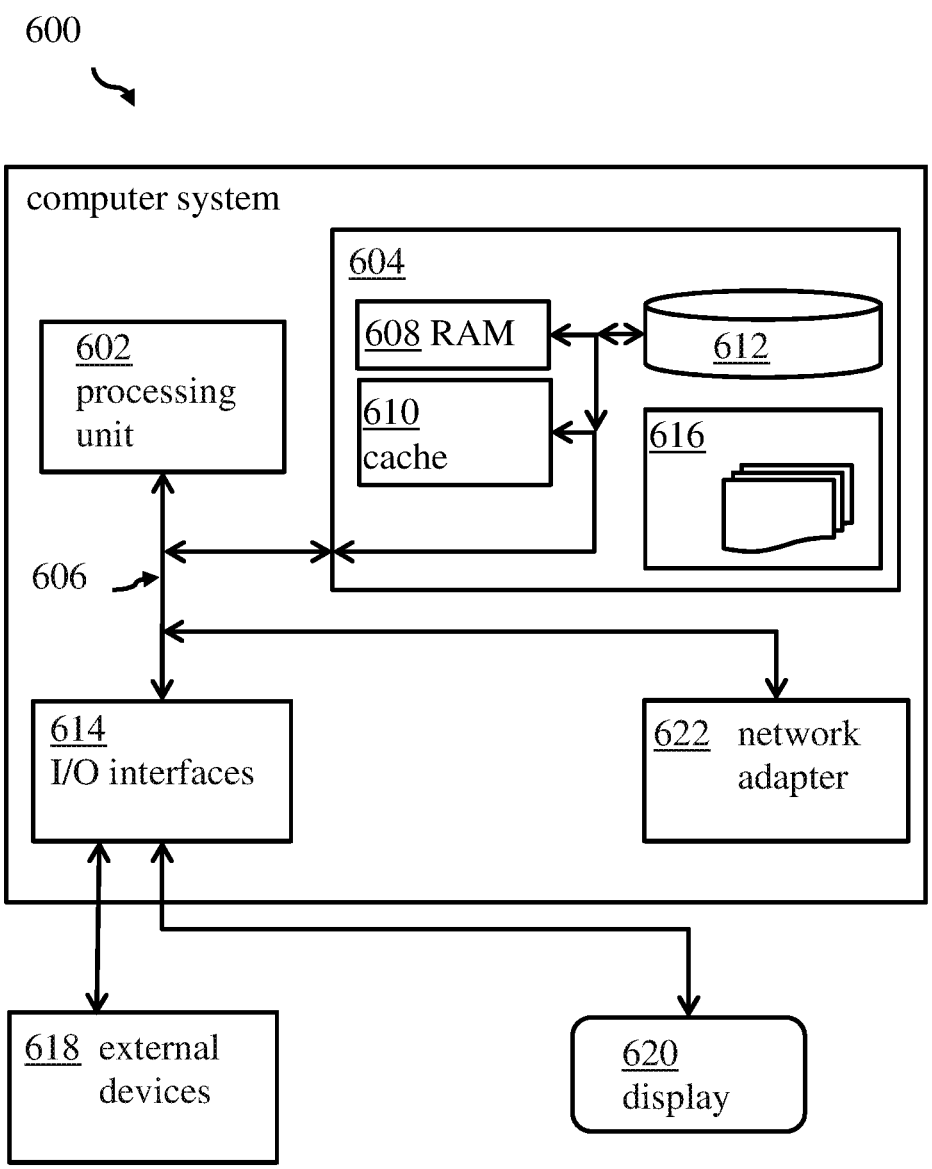
FIG. 6 shows a block diagram of a computing system suitable to execute program code according to embodiments of the present disclosure.

Embodiments of the invention may be implemented together with virtually any type of computer, regardless of the platform being suitable for storing and/or executing program code. Referring now to FIG. 6, shown, as an example, a computing system 600 suitable for executing program code related to the proposed method.

The computing system 600 is only one example of a suitable computer system, and is not intended to suggest any limitation as to the scope of use or functionality of embodiments of the invention described herein, regardless, whether the computer system 600 is capable of being implemented and/or performing any of the functionality set forth herein-above. In the computer system 600, there are components, which are operational with numerous other general purpose or special purpose computing system environments or configurations. Examples of well-known computing systems, environments, and/or configurations that may be suitable for use with computer system/server 600 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 600 may be described in the general context of computer system-executable instructions, such as program modules, being executed by a computer system 600. Generally, program modules may include routines, programs, objects, components, logic, data structures, and so on that perform particular tasks or implement particular abstract data types. Computer system/server 600 may be practiced in distributed cloud computing environments where tasks are performed by remote processing devices that are linked through a communications network. In a distributed cloud computing environment, program modules may be located in both, local and remote computer system storage media, including memory storage devices.

As shown in FIG. 6, computer system/server 600 is shown in the form of a general-purpose computing device. The components of computer system/server 600 may include, but are not limited to, one or more processors or processing units 602, a system memory 604, and a bus 606 that couple various system components including system memory 604 to the processor 602. Bus 606 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 600 typically includes a variety of computer system readable media. Such media may be any available media that is accessible by computer system/server 600, and it includes both, volatile and non-volatile media, removable and non-removable media.

The system memory 604 may include computer system readable media in the form of volatile memory, such as random access memory (RAM) 608 and/or cache memory 610. Computer system/server 600 may further include other removable/non-removable, volatile/non-volatile computer system storage media. By way of example only, a storage system 612 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 606 by one or more data media interfaces. As will be further depicted and described below, memory 604 may include at least one program product having a set (e.g., at least one) of program modules that are configured to carry out the functions of embodiments of the invention.

The program/utility, having a set (at least one) of program modules 616, may be stored in memory 604 by way of example, and not limiting, as well as an operating system, one or more application programs, other program modules, and program data. Each of the operating systems, one or more application programs, other program modules, and program data or some combination thereof, may include an implementation of a networking environment. Program modules 616 generally carry out the functions and/or methodologies of embodiments of the invention, as described herein.

The computer system/server 600 may also communicate with one or more external devices 618 such as a keyboard, a pointing device, a display 620, etc.; one or more devices that enable a user to interact with computer system/server 600; and/or any devices (e.g., network card, modem, etc.) that enable computer system/server 600 to communicate with one or more other computing devices. Such communication can occur via Input/Output (I/O) interfaces 614. Still yet, computer system/server 600 may communicate with one or more networks such as a local area network (LAN), a general wide area network (WAN), and/or a public network (e.g., the Internet) via network adapter 622. As depicted, network adapter 622 may communicate with the other components of computer system/server 600 via bus 606. It should be understood that, although not shown, other hardware and/or software components could be used in conjunction with computer system/server 600. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for automatically generating a client-side application based on available components, the method comprising:
    storing, in a component repository, a source code and a related build information of a first component, the first component being developed in a developer mode of a developer tool;
    changing an existing single-page application based on end-user input and without developer input by:
    receiving selection, by the end-user, of the first component from the component repository;
    retrieving the first component from the component repository;
    extracting the related build information from the first component;
    adding dependencies regarding the first component to a single-page packaging of the existing single-page application; and
    compiling the existing single-page application, without developer input, together with the first component to produce a first compiled single-page application; and
    deploying the first compiled single-page application, without developer input, by making it available in a repository where it is downloadable and executable by a browser of an end point device.

2. The method of claim 1, wherein the first component is a result of a TypeScript based front-end web application framework.

3. The method of claim 1, wherein the single-page packaging of the existing single-page application is based on JavaScript Object Notation.

4. The method of claim 1, wherein the compiling is performed by NPM.

5. The method of claim 1, wherein the compiling is performed after one of either a regular time interval or a predetermined time period.

6. The method of claim 1, wherein for selecting the first component, components from a plurality of repositories are available.

7. The method of claim 1, wherein the repository is an app store.

8. The method of claim 1, further comprising:
    selecting a second component from the repository;
    retrieving the second component from the component repository;
    extracting related build information from the second component;
    adding dependencies regarding the second component to a single-page packaging of the existing single-page application; and
    compiling the existing single-page application together with the first component and the second component to produce a second compiled single-page application.

9. A developer system for automatically generating a client-side application based on available components, the system comprising:
    a component repository adapted for storing a source code and related build information of a component, the component being developed in a developer mode of a developer tool;
    a non-expert editing tool adapted for changing an existing single-page application based on end-user input and without developer input by use of:
    a selection unit adapted for receiving selection, by the end-user, of the component from the component repository;
    a retriever unit adapted for retrieving the component from the repository;
    an extraction unit adapted for extracting build information from the component; an adder unit adapted for adding dependencies regarding the component to a single-page packaging of the existing single-page application; and
    a compile unit adapted for compiling, without developer input, the single-page application together with the component to produce a compiled single-page application; and
    a deployment unit adapted for deploying the first compiled single-page application, without developer input, by making it available in a repository where it is downloadable and executable by a browser of an end point device.

10. The system of claim 9, wherein the component is a result of a TypeScript based front-end web application framework.

11. The system of claim 9, wherein the single-page packaging is based on JavaScript Object Notation.

12. The system of claim 9, wherein compiling is performed by NPM.

13. The system of claim 9, wherein compiling is performed after one of either a regular time intervals or a predetermined time period.

14. The system of claim 9, wherein for selection the component, components from a plurality of repositories are available.

15. The system of claim 11, wherein the repository is an app store.

16. A computer program product for automatically generating a client-side application based on available components, the computer program product comprising a computer readable storage medium having program instructions embodied therewith, the program instructions being executable by one or more computing systems or controllers to cause the one or more computing systems to:
    store, in a component repository, a source code and a related build information of a component, the component being developed in a developer mode of a developer tool;
    change an existing single-page application based on end-user input and without developer input by:
    receiving selection, by the end-user, of the component from the component repository;
    retrieving the component from the component repository;
    extracting the related build information from the component;

adding dependencies regarding the component to a single-page packaging of the existing single-page application; and compiling the existing single-page application, without developer input, together with the component to produce a compiled single-page application; and deploying the first compiled single-page application, without developer input, by making it available in a repository where it is downloadable and executable by a browser of an end point device.

\* \* \* \* \*